UNITED STATES PATENT OFFICE.

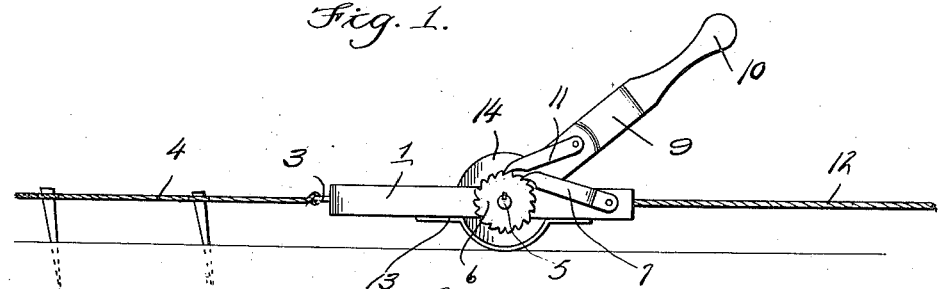
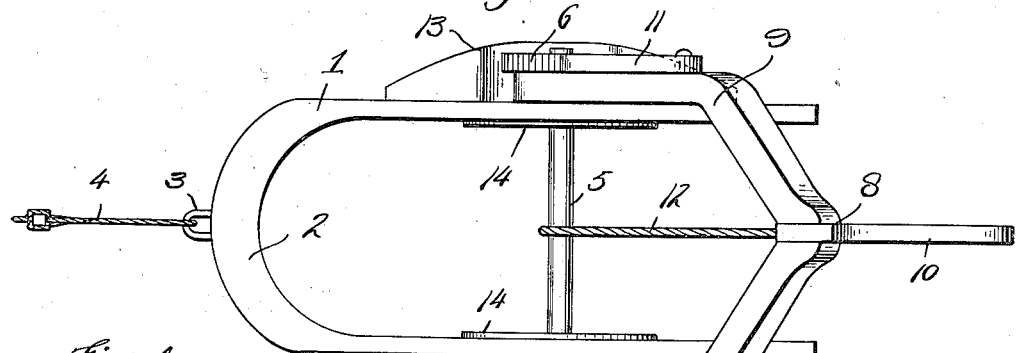
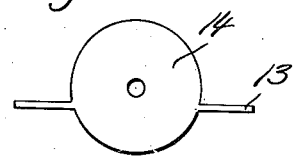
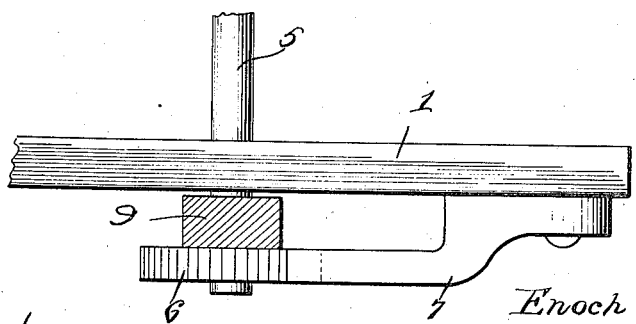

ENOCH THOMPSON, OF STAFFORD, KANSAS.

COMBINED AUTO PULLER AND JACK.

1,268,896.  Specification of Letters Patent.  Patented June 11, 1918.

Application filed May 28, 1917. Serial No. 171,504.

*To all whom it may concern:*

Be it known that I, ENOCH THOMPSON, a citizen of the United States, residing at Stafford, in the county of Stafford and State of Kansas, have invented certain new and useful Improvements in Combined Auto Pullers and Jacks, of which the following is a specification.

This invention relates to automobile pullers having primarily for its object to provide an incumbersome structure which may be anchored adjacent an automobile or other vehicle that might be incapacitated on the road of travel, and placed in connection with a rigid part of the automobile or vehicle, pursuant to which the vehicle may be extricated by a simple manual operation.

A coördinate object of the invention is to provide a device of the above named character which may be used as a hoisting jack by merely pendently supporting the device above the object to be hoisted and securing the draft cable to the latter, followed by a manual operation to wind up the draft cable with an obvious result.

The above and other objects and advantages of this invention will be in part described, and in part understood from the following description of the present preferred embodiment, the same being illustrated in the accompanying drawings, in which;

Figure 1 is a side elevational view of a device constructed in accordance with my invention.

Fig. 2 is a top plan view of the same.

Fig. 3 is a detail enlarged top plan fragmentary view of the device, showing especially the manner of coöperation between the locking pawl and one of the drum ratchets, and Fig. 4 is a side elevational view of one of the combined runners and abutments used in my invention.

In the drawings a frame 1 is provided which is preferably made of metal and in this instance consists of two parallel bars the ends of which are connected by an arched cross-piece 2 to which a staple or other securing member 3 is fixed. The staple is adapted for engagement with one end of a cable 4, the latter being in turn connected to some rigid object such as pegs shown in Fig. 1.

A drum 5 is revolubly mounted in said frame, the ends of which extend through the sides of the latter and are equipped with ratchet wheels 6. The ratchet wheels are keyed or otherwise fixedly secured to the drum. Locking pawls 7 are pivotally mounted on the outer faces of said frame 1 and are adapted to engage the ratchet wheels 6 to prevent reverse movement of the latter.

A drum operating member generally designated at 8 is provided, which consists of a yoke member 9, the free terminals of which are pivoted on the drum 5 between the outer faces of the side members of the frame 1 and the ratchets 6. A handle portion 10 extends from the vertex of the yoke 9. Pivoted pawls 11 are carried by the yoke member 9, said pawls normally gravitating into engagement with the teeth of the ratchet wheels 6, whereby movement of the handle 10, in the direction of the end 2 of the frame, will cause the drum 5 to be rotated.

One end of a draft cable 12 is secured to the drum 5 whereby rotation of the latter will cause the cable to be wound upon the drum. It is to be understood that the free end of the cable 12 is to be engaged with the incapacitated vehicle whereby the winding of the cable 12 will cause the vehicle to be extricated.

Secured to the lower margin of each of the side members of the frame 1, is a runner 13 which is relatively wide, and which gradually diminishes in width, toward its terminals. The inner margin of said runners, approximately midway the ends of the latter, are equipped with right angular circular abutments 14. The drum 5 passes through said abutment, the latter confining the edgewise movement of said cable 12 when the latter is wound on the drum 5. The runners 13 are depressed at that point where the abutments 14 are connected therewith, these depressed portions adapted for contact with the ground or other supporting base upon which the frame 1 is mounted. The runners as will be appreciated, will facilitate movement of the frame on the ground, and furthermore will hold the same in elevated position above the ground so as to prevent contact of the ratchet wheels, and the free terminals of the yoke member 9, with the ground. In conjunction with these functions, it will be noted, as above set forth, that the runners are relatively wide so that when the handle portion 8 is swung toward the closed end 2 of the frame, the dogs 11 will be limited in their downward movement.

When the device is to be used as an auto puller, the cable 4 is to be secured to a rigid object adjacent the incapacitated vehicle, and the draft cable 12 secured to a rigid part of the incapacitated vehicle. Assuming that the handle is in the position as shown in Fig. 1, it will be seen that by movement of the handle toward the closed end of the frame the drum 5 will be rotated thereby winding the draft cable 12 on the drum, and extricating the incapacitated vehicle. When the device is desired to be used as a hoisting jack, the cable 4 is secured to some rigid object above the object which is to be hoisted, permitting the frame 1 to depend therefrom, and the draft cable 12 then secured to the object which is to be hoisted. The manual operation of the handle 10 will cause the cable 12 to be wound on the drum with an obvious result.

It will be understood that the above description and accompanying drawings comprehend only the general and preferred embodiment of my invention and that various minor changes in details of construction, proportion and arrangement of parts may be made within the scope of the appended claims without sacrificing any of the advantages of my invention.

I claim:

A device of the character described comprising, a frame, a revoluble drum, a ratchet wheel provided on each end of said drum, a pair of runners secured to the lower margin of each of the side members of the frame, said runners having their inner margins provided with right angular circular abutments through which the drum passes, and means engaging said ratchet wheels for revolving the drum.

In testimony whereof I affix my signature in presence of two witnesses.

ENOCH THOMPSON.

Witnesses:
ANDEE HARTNETT,
W. F. SANDIFER.